United States Patent
Breitlow et al.

(10) Patent No.: US 12,436,175 B2
(45) Date of Patent: *Oct. 7, 2025

(54) POWER CONVERTER FOR A THERMAL SYSTEM

(71) Applicant: WATLOW ELECTRIC MANUFACTURING COMPANY, St. Louis, MO (US)

(72) Inventors: Stanton H. Breitlow, Winona, MN (US); John F. Lemke, St. Louis, MO (US); James Hentges, Fountain City, WI (US); Keith Douglas Ness, St. Louis, MO (US); Eric Ellis, Columbia, MO (US); William Bohlinger, Winona, MN (US); Matthew Yender, Winona, MN (US); Dean R. McCluskey, Winona, MN (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/957,247

(22) Filed: Sep. 30, 2022

(65) Prior Publication Data

US 2023/0021550 A1 Jan. 26, 2023

Related U.S. Application Data

(63) Continuation of application No. 16/861,980, filed on Apr. 29, 2020, which is a continuation of application
(Continued)

(51) Int. Cl.
*H05B 1/02* (2006.01)
*F24D 11/02* (2006.01)
(Continued)

(52) U.S. Cl.
CPC ........ *G01R 19/225* (2013.01); *F24D 11/0207* (2013.01); *G01R 19/16519* (2013.01);
(Continued)

(58) Field of Classification Search
CPC ............ G01R 19/225; G01R 19/16519; G01R 19/257; F24D 11/0207; H01L 21/67115; H05B 1/0233; Y02B 30/17
See application file for complete search history.

(56) References Cited

U.S. PATENT DOCUMENTS 3,915,827 A * 10/1975 Davies ............ G01N 27/44713
204/459
4,844,072 A * 7/1989 French ...................... A61F 7/02
219/535
(Continued)

FOREIGN PATENT DOCUMENTS

JP 2002215246 A * 7/2002
KR 1020010071917 A 7/2001
(Continued)

OTHER PUBLICATIONS

Decision of Final Rejection in Korean counterpart application No. 10-2022-7010522 issued on Nov. 22, 2022 and English translation thereof, 9 pages.
(Continued)

*Primary Examiner* — Tiffany T Tran
(74) *Attorney, Agent, or Firm* — Burris Law, PLLC (57) ABSTRACT

A control system for controlling an adjustable output voltage provided to a heater includes a controller configured to determine an input parameter based on an electrical characteristic of the heater, where the heater includes a resistive heating element that is operable to emit heat and as a sensor. The controller is further configured to determine an output voltage for the heater based on the input parameter and a
(Continued)

desired setpoint, and to transmit a signal to a power converter to generate the output voltage. The desired setpoint is based on an operational state of the heater, and the input parameter includes data indicative of a temperature of the resistive heating element that is determined based on the electrical characteristic.

19 Claims, 7 Drawing Sheets

Related U.S. Application Data

No. 15/624,060, filed on Jun. 15, 2017, now Pat. No. 10,690,705.

(60) Provisional application No. 62/350,275, filed on Jun. 15, 2016.

(51) Int. Cl.
    *G01R 19/165*     (2006.01)
    *G01R 19/22*     (2006.01)
    *G01R 19/257*     (2006.01)
    *H01L 21/67*     (2006.01)

(52) U.S. Cl.
    CPC ...... *G01R 19/257* (2013.01); *H01L 21/67115* (2013.01); *H05B 1/0233* (2013.01); *Y02B 30/17* (2018.05)

(56) References Cited

U.S. PATENT DOCUMENTS

| | | | |
|---|---|---|---|
| 5,436,172 A * | 7/1995 | Moslehi | H01L 21/67115 250/341.1 |
| 6,574,581 B1 * | 6/2003 | Bohrer | F24F 11/62 700/286 |
| 7,196,295 B2 | 3/2007 | Fennewald et al. | |
| 7,257,464 B2 | 8/2007 | Fennewald et al. | |
| 8,423,193 B2 | 4/2013 | Fennewald et al. | |
| 9,625,923 B2 | 4/2017 | Bohlinger et al. | |
| 2006/0015274 A1 * | 1/2006 | Trandafir | H02M 3/157 702/64 |
| 2007/0158333 A1 * | 7/2007 | Kosaka | F02D 41/1494 219/483 |
| 2008/0168766 A1 * | 7/2008 | Oomura | B60H 1/025 60/320 |
| 2010/0200565 A1 * | 8/2010 | Leung | H05B 3/68 219/443.1 |
| 2011/0174801 A1 | 7/2011 | Schwerman | |
| 2011/0204866 A1 * | 8/2011 | Moon | H02M 1/36 323/284 |
| 2013/0238144 A1 * | 9/2013 | Shahapurkar | G05D 23/19 700/278 |
| 2013/0287377 A1 * | 10/2013 | Serebryanov | H01L 21/67115 392/416 |
| 2014/0042657 A1 * | 2/2014 | Mulliken | B29C 64/118 425/113 |
| 2016/0126565 A1 * | 5/2016 | Kwon | H01M 8/04731 429/437 |
| 2016/0219654 A1 * | 7/2016 | Cho | H05B 6/687 |

FOREIGN PATENT DOCUMENTS

| | | |
|---|---|---|
| KR | 1020150004389 A | 1/2015 |
| WO | 2001052602 A1 | 7/2001 |
| WO | 2013163056 A1 | 10/2013 |
| WO | 2015016885 A1 | 2/2015 |

OTHER PUBLICATIONS

European Search Report issued in corresponding EP Application No. 22186721.1, issued Oct. 14, 2022, 5 pages.
Office Action issued in corresponding KR Application No. 1020237023444 dated Mar. 6, 2024 and English Translation, 15 pages.

\* cited by examiner

FIG. 5A
5% Conduction

FIG. 5B
25% Conduction

FIG. 5C
50% Conduction

FIG. 6A

5% Conduction

FIG. 6B

25% Conduction

FIG. 6C

50% Conduction

POWER CONVERTER FOR A THERMAL SYSTEM

CROSS-REFERENCE TO RELATED APPLICATIONS

This application is a continuation of U.S. application Ser. No. 16/861,980, filed Apr. 29, 2020, which is a continuation of U.S. application Ser. No. 15/624,060, filed Jun. 15, 2017, now U.S. Pat. No. 10,690,705, which claims the benefit of U.S. Provisional Application No. 62/350,275, filed Jun. 15, 2016. The disclosures of the above applications are incorporated herein by reference.

FIELD

The present disclosure relates to thermal systems and more particularly, to thermal systems having varied power.

BACKGROUND

The statements in this section merely provide background information related to the present disclosure and may not constitute prior art.

Generally, a pedestal heater is a semiconductor processing tool for heating a wafer disposed thereon. The pedestal heater includes a heating plate and a support shaft disposed under the heating plate. The heating plate may include a ceramic substrate and a plurality of resistive heating elements embedded in the ceramic substrate to define a plurality of heating zones. Typically, the same power is applied to the plurality of resistive heating elements at the same ramp rate during heater startup.

Despite the same power applied to the resistive heating elements, some resistive heating elements may be heated faster than the other heating elements due to, for example, the position of the heating zones relative to heat sinks, and differences in the characteristics of the heating zones caused by non-uniform manufacturing. When a heating zone is heated faster than an adjacent heating zone, the temperature difference between the adjacent heating zones causes different thermal expansion and consequently thermal stress between the adjacent heating zones. Significant thermal stress may result in generation of thermal cracks in the ceramic substrate.

SUMMARY

In one form, the present disclosure is directed to a control system for controlling an adjustable output voltage provided to a heater. The control system includes a controller configured to determine an input parameter based on an electrical characteristic of the heater, where the heater includes a resistive heating element that is operable to emit heat and as a sensor. The controller is further configured to determine an output voltage for the heater based on the input parameter and a desired setpoint, and to transmit a signal to a power converter to generate the output voltage. The desired setpoint is based on an operational state of the heater, and the input parameter includes data indicative of a temperature of the resistive heating element that is determined based on the electrical characteristic.

In some forms, the control system further includes a power converter including a power switch and operable to generate the output voltage. The power converter includes a power switch configured to generate the output voltage and a driver circuit configured to operate the power switch to generate the output voltage.

In some forms, the control system further includes a sensor circuit configured to measure the electrical characteristic of the heater.

The some forms, the electrical characteristic includes at least one of a voltage and an electric current of the heater.

In some forms, the control system further includes a power converter is electrically coupled to the heater by way of temperature sensing power pins that define a first junction and a second junction, and a sensor circuit configured to electrically couple to the first junction and the second junction. The controller is configured to measure a change in voltage at the first junction and the second junction via the sensor circuit and determine the temperature of the resistive heating element based on the change in voltage.

In some forms, the desired setpoint includes at least one of a desired power level, a desired temperature, a rate of change in temperature, and a rate in change of power.

In some forms, the controller is configured to select the operational state from among a plurality of defined operational states. In some forms, the plurality of defined operational states includes at least two of an idle mode in which no power is provided, a start-up mode in which the output voltage is provided to only measure the electrical characteristic, a soft-start mode in which the output voltage is gradually increased, a rate mode in which the output voltage is increased at a rate higher than that of the soft-start mode, and a hold mode in which a temperature of the heater is controlled to a defined setpoint.

In some forms, the controller is configured to independently control a plurality of heating elements of the heater based on the operational state. In some forms, the controller is configured to perform a model-based control routine to match a proportional-integral derivative state of the heater to the operational state.

In some forms, a sensor circuit is configured to measure a voltage and an electric current of the heater, as the electrical characteristic, and the controller is configured to calculate a resistance of the resistive heating element based on the voltage and the electric current, determine the temperature of the resistive heating element based on the resistance, and set the output voltage based on the temperature, the resistance, the voltage, the electric current or a combination thereof. The input parameter includes data indicative of at least one of the resistance, the voltage, and the electric current of the resistive heating element.

In some forms, the input parameter includes data indicative of at least one of a resistance, an electric current, and a voltage of the resistive heating element.

In some forms, the controller is configured to calculate a resistance of the resistive heating element based on a voltage and an electric current of the resistive heating element, as the electrical characteristic, determine temperature of the resistive heating element based on the resistance, and set the output voltage based on the temperature, the resistance, the voltage, the electric current, or a combination thereof.

In some forms, the controller is configured to continuously vary an amplitude of the output voltage based on a desired power of the heater.

In some forms, the control system further includes a power converter and a sensor circuit. The power converter includes a power switch and operable to generate an adjustable output voltage, and the sensor circuit configured to measure the electrical characteristics of the heater, where the electrical characteristics includes at least one of a voltage and an electric current. The controller is configured to operate the power switch of the power converter to generate the output voltage.

In one form, the present disclosure is directed to a method for controlling a heater. The method includes measuring at least one of a voltage and an electric current of the heater, where the heater includes a resistive heating element that is operable to emit heat and as a senso, determining an input parameter based on the at least one of the voltage and the electric current, where the input parameter includes data indicative of a temperature of the resistive heating element, and setting an output voltage for the heater based on the input parameter and a desired setpoint, where the desired setpoint is based on an operational state of the heater.

In some forms, the desired setpoint includes at least one of a desired power level, a desired temperature, a rate of change in temperature, and a rate in change of power.

In some forms, the method further includes selecting the operational state from among a plurality of defined operational states, where the plurality of defined operational states includes at least two of an idle mode in which no power is provided, a start-up mode in which the output voltage is provided to only measure the at least one of the voltage and the electric current, a soft-start mode in which the output voltage is gradually increased, a rate mode in which the output voltage is increased at a rate higher than that of the soft-start mode, and a hold mode in which a temperature of the heater is controlled to a defined setpoint.

In some forms, the method further includes calculating a resistance of the resistive heating element based on the voltage and the electric current, and determining a temperature of the resistive heating element based on the resistance, wherein the output voltage is set based on the temperature, the resistance, the voltage, the electric current, or a combination thereof.

In some forms, the input parameter includes data indicative of at least one of a resistance of the resistive heating element, the electric current of the resistive heating element, the voltage of the resistive heating element, and an applied power.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
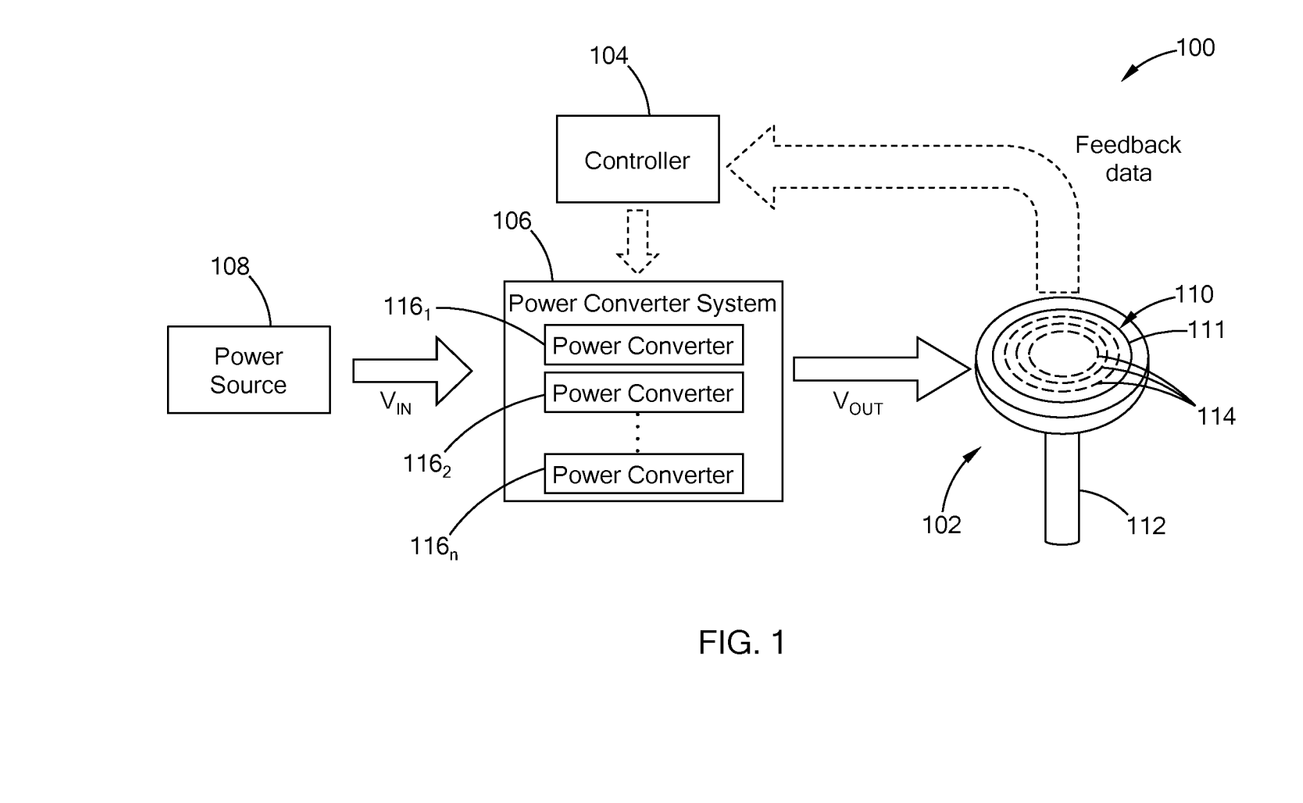
FIG. 1 is a block diagram of an electrical thermal system in accordance with the teachings of the present disclosure.

Referring to FIG. 1, a thermal system 100 constructed in accordance with the teachings of the present disclosure includes a heater 102, a controller 104 (i.e., a control module), and a power converter system 106. The controller 104 and the power converter system 106 control the power supplied to the heater 102 from a power source 108. More particularly, the controller 104 and the power converter system 106 operate as a control system for monitoring and if needed, adjusting the power supplied to the heater 102. As described in detail below, the controller 104 receives feedback data from the heater 102 to determine if power to any of the heater zones of the heater 102 is to be adjusted, and if so, adjusts the power by transmitting signals to the power converter system 106 to have one or more power converters output a controlled voltage to respective heater zones of the heater 102.

In one form of the present disclosure, the heater 102 is a pedestal heater including a heating plate 110 and a support shaft 112 disposed at a bottom surface of the heating plate 110. The heating plate 110 includes a substrate 111 and a plurality of resistive heating elements (not shown) embedded in the substrate 111 in one form of the present disclosure. The resistive heating elements may also be disposed on at least one surface of the substrate 111 while remaining within the scope of the present disclosure. The substrate 111 may be made of ceramics or aluminum. The resistive heating elements are independently controlled by the controller 104 and define a plurality of heating zones 114 as illustrated by the dotted lines in the figure. It should be understood that these heating zones 114 are merely exemplary and could take on any configuration while remaining within the scope of the present disclosure.

The resistive heating elements can be configured in various suitable ways. For example, in one form of the present disclosure, each of the resistive heating elements is connected to a first power pin and a second power pin to define a first junction and a second junction, respectively. The first and second power pins are connected to wires which extend from the heating plate 110 through the support shaft 112 of the heater 102 to the controller 104. The first and second power pins function as thermocouple sensing pins for measuring temperature of the heater 102. Using the power pins as a thermocouple to measure a temperature of a resistive heating element has been disclosed in co-pending application, U.S. Ser. No. 14/725,537, filed May 29, 2015 and titled "RESISTIVE HEATER WITH TEMPERATURE SENSING POWER PINS," which is commonly owned with the present application and the contents of which are incorporated herein by reference in its entirety. Generally, the controller 104, which is in communication with the first and second power pins, is configured to measure changes in voltage at the first and second junctions. More specifically, the controller 104 measures millivolt (mV) changes at the junctions and then uses these changes in voltage to calculate an average temperature of the resistive heating element. In one form, the controller 104 may measure changes in voltage at the junctions without interrupting power to the resistive heating element. This may be accomplished, for example, by taking a reading at the zero crossing of an AC input power signal. In another form, power is interrupted and the controller 104 switches from a heating mode to a measuring mode to measure the changes in voltage. Once the average temperature is determined, the controller 104 switches back to the heating mode.

The heater 102 may be configured in various suitable ways, and is not limited to the two pin resistive heating elements. For example, the heater 102 may be a "two-wire" heater such that changes in resistance can be used by the controller 104 to determine temperature. Such a two-wire system is disclosed in U.S. Pat. No. 7,196,295, which is commonly owned with the present application and the contents of which are incorporated herein by reference in their entirety. In a two-wire system, the thermal system is an adaptive thermal system that merges heater designs with controls that incorporate power, resistance, voltage, and current in a customizable feedback control system that limits one or more these parameters (i.e., power, resistance, voltage, current) while controlling another. The controller 104 is configured to monitor at least one of current, voltage, and power delivered to the heater over a period time to acquire stable continuous current and voltage readings. These readings can then be used for determining resistance, and thus, temperature of the heater. Alternately, the controller 104 may be coupled to discrete temperature and/or resistance sensor(s) (e.g., a separate thermocouple).

The power converter system 106 include a plurality of power converters 116 ($116_1$ to $116_n$ in figures). One or more power converters 116 are connected to heating elements of a heating zone of the heater 102 to supply voltage to the heating elements. As described further below, each power converter 116 is operable to adjust an input voltage ($V_{IN}$) from the power source 108 to an output voltage ($V_{OUT}$) that is applied to the heating elements of the heater 102, where the output voltage is less than or equal to the input voltage.

The controller 104 includes electronics including microprocessor and memory, and is configured to control the power supplied to the resistive heating elements of the heater 102 by the power converter system 106. As described further below, the controller 104 operates the power converter system 106 to adjust the voltage applied to the heater 102 based on feedback data from the heater 102 and pre-stored control algorithms and/or processes. In one form of the present disclosure, an input voltage from the power source 108 is scaled using a scaling factor, such as that disclosed in U.S. Pat. Nos. 7,257,464 and 8,423,193, which are commonly assigned with the present application and the contents of which are incorporated herein by reference in their entirety. The input voltage can be scaled based on a preset user value. The preset user value is one of maximum voltage output level and maximum power output level, or generally may be current, voltage, or wattage. The current is measured simultaneously with scaling the voltage and providing power to the heater. The scaling comprises a gradual ramp-up, or a ramping function, to detect heater characteristics during the ramp-up. The heater characteristics include one of low heater resistance and a heater short. In another form, the controller 104 determines resistance of the heater 102 for scaling the input voltage based on the control algorithm.

Figure 2:
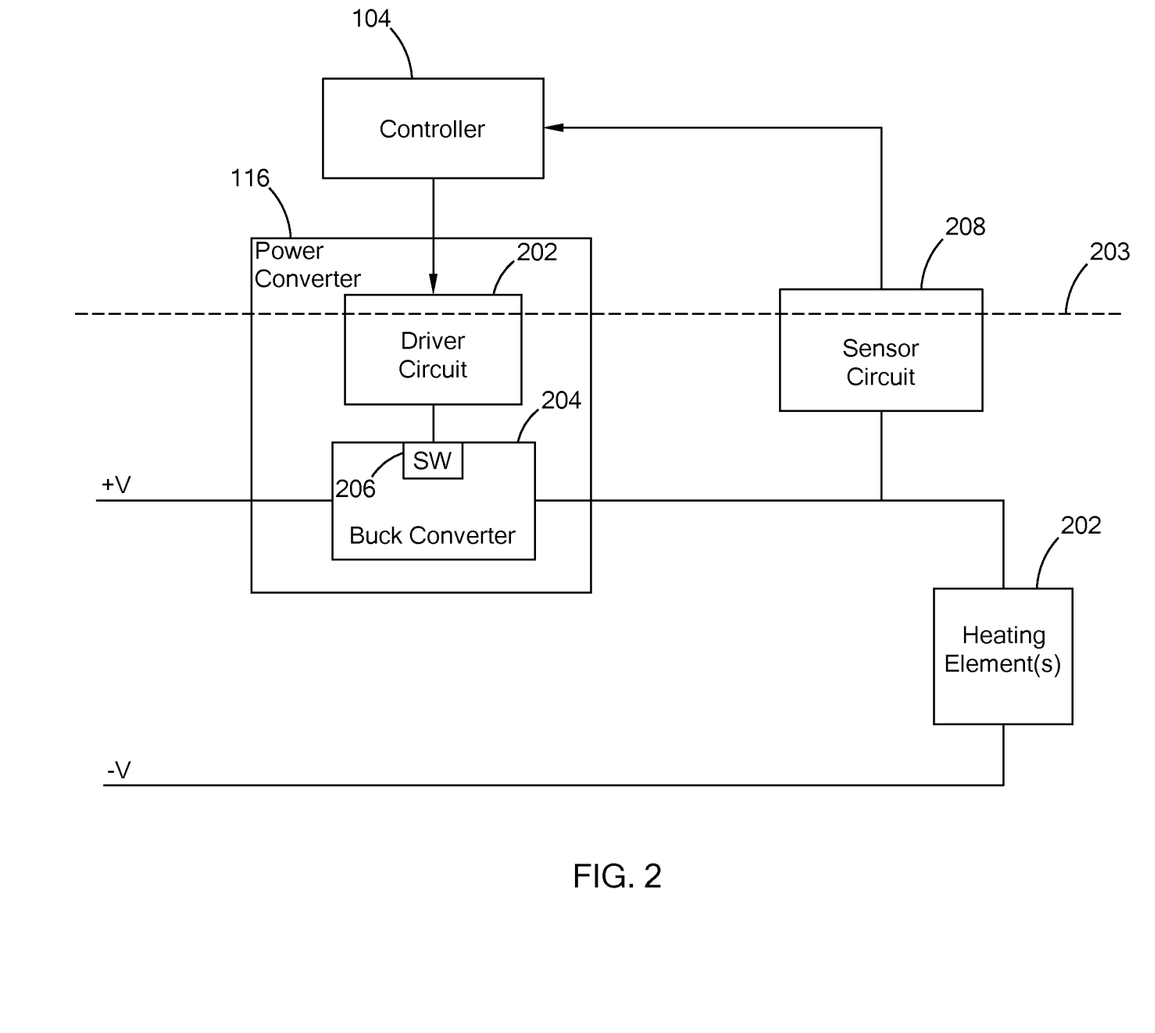
FIG. 2 is a block diagram of a power converter of the electrical thermal system of FIG. 1 in accordance with the teachings of the present disclosure.

Referring to FIG. 2, the system 100 includes electronic components, such as the controller 104 that operate at a lower voltage than, for example, the power converters 116. Accordingly, to protect the low voltage components from high voltage, the system 100 includes electronic components that isolate the low voltage components from the high voltage components and still allow the components to exchange signal. For purposes of illustration, a dashed line 203 represents the isolation of a low voltage section from a high voltage section of the system 100.

A given power converter 116 includes a driver circuit 202 and a buck converter 204 having a control switch 206 ("SW" in figure), which may also be referred to as a power switch. The driver circuit 202 operates the control switch 206 based on an input signal from the controller 104. The driver circuit 202 includes electronics, such as an opto-isolator, or a transformer, among others, to communicate with the controller 104 and isolate the controller 104 from the power converter 116.

Generally, the buck converter 204, as a step-down voltage converter, is operable to decrease the voltage of the power source 108. In particular, the AC voltage from the power source 108 (e.g., 208 VAC) is rectified to a rectified AC voltage that is then received by the buck converter 204. Based on the operation of the control switch 206, the buck converter 204 decreases the voltage and increases the current from the power source 108 and applies the adjusted voltage and current to respective heating elements 207 of the heater 102. To reduce voltage ripple; filters made of capacitors or a combination of capacitor and inductors are added to the output and/or the input of the buck converter 204.

The system 100 further includes a sensor circuit 208 that transmits signals indicative of the performance of the heater 102 to the controller 104. The sensor circuit 208 may include electronics, such as isolated analog-to-digital converters, opto-isolators, or transformers, among others, for transmitting signals between the low and high voltage sections of the system. In one form of the present disclosure, the sensor circuit 208 includes a current sense resistor, a voltage sense resistor, and a transistor for shunting the current sense resistor to carry the load current when the control switch 206 is in predetermined state. The current sense resistor, the voltage sense resistor, and the transistor are coupled to the buck converter 204 of the power converter 116. The sensor circuit 208 measures at least one of current or voltage applied to the heating elements by the buck converter 204, and transmits the data as feedback to the controller 104, which in return determines the desired output voltage of the power converter 116.

Figure 3:
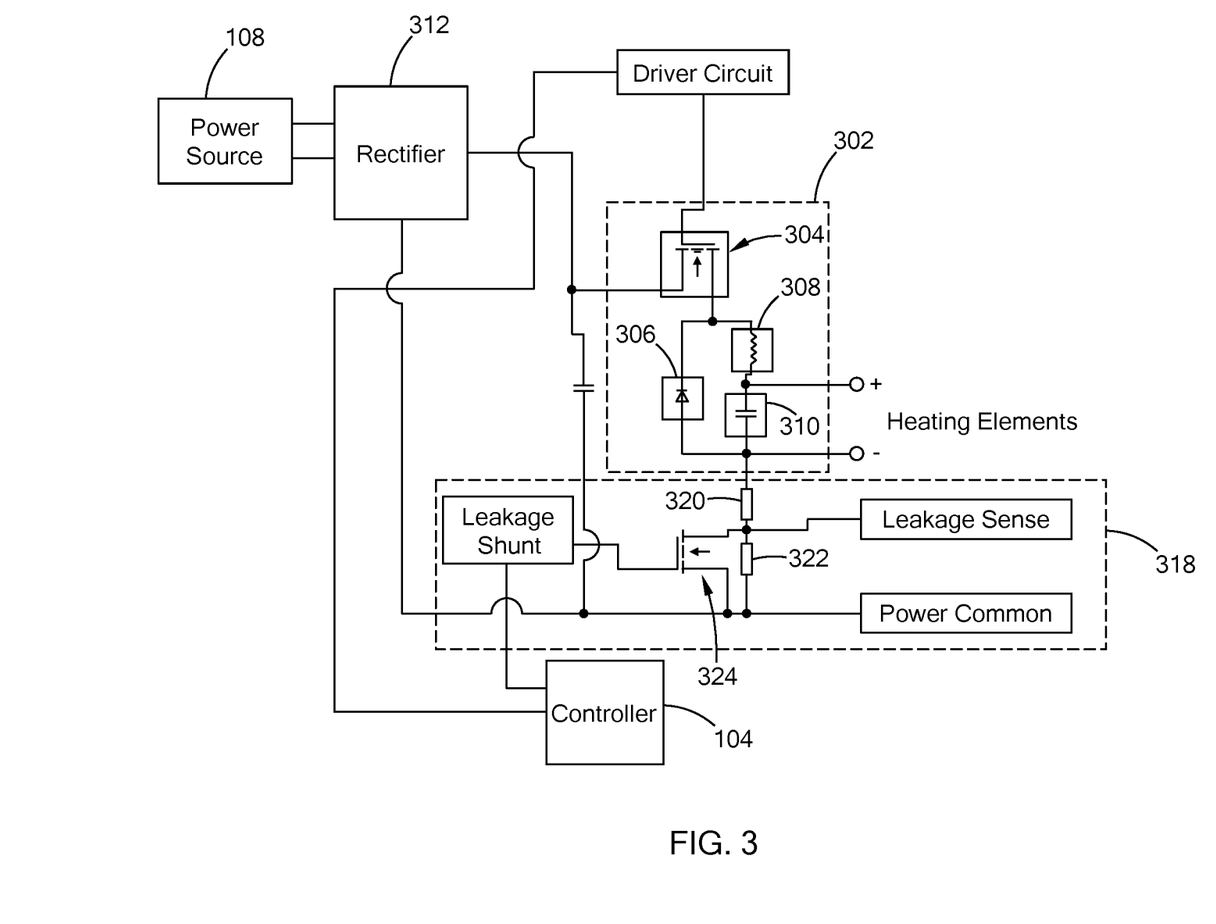
FIG. 3 is a schematic diagram of the power converter of FIG. 2 in accordance with the teachings of the present disclosure.

Referring to FIG. 3, an example schematic diagram of the power converter 116 having a buck converter 302 is illustrated. The buck converter 302 includes a transistor 304 (e.g., field effect transistor), a diode 306, an inductor 308, and a capacitor 310. The transistor 304 is operable as a switch to control the flow of current through the buck converter 302. Generally, a transistor includes a control terminal and based on a voltage applied to the control terminal, the transistor can operate as a closed switch to have electric current flow through a conducting channel between the source and drain regions of the transistor or as an open switch in which no current flows through the conducting channel. An N-type transistor performs as an open switch when no voltage is applied to the control terminal and as a closed switch when voltage (e.g., 5V) is applied. Alternatively, a P-type transistor performs as an open switch when voltage is applied to the control terminal, and as a closed switch when no voltage is applied to the control terminal.

While the transistor 304 is illustrated as an N-type transistor, the transistor 304 may also be a P-type.

The buck converter 302 receives a rectified voltage from a rectifier 312 that is coupled to the power source 108, and applies an output voltage to the heating elements. Generally, when the transistor 304 is in a closed state (i.e., closed switch), the buck converter 302 is electrically coupled to the rectifier 312 such that current through the converter 302 begins to increase. An opposing voltage is generated across the inductor 308 terminals that counteracts the voltage from the rectifier 312, thereby reducing the net voltage across the terminals of the heating elements. Overtime, the rate of change of current begins to decrease, thus decreasing the voltage across the inductor 308 and increasing the voltage applied to the terminals of the heating elements. When the transistor 304 is in the open state (i.e., open switch), the buck converter 302 is electrically decoupled from the rectifier 312 and the inductor 308 begins to discharge causing a voltage drop across the inductor 308 and operating as a current source. Specifically, the magnetic field generated by the inductor 308 supports the current flowing through the terminals of the heating elements.

FIG. 3 also illustrates an example of a sensor circuit 318 that includes a current sense resistor 320, a leakage sense resistor 322 and a field effect transistor (FET) 324 for shunting the leakage sense resistor 322. The sensor circuit 318 is in communication with the controller 104 and provide data indicative of, for example, phase voltage and root mean square (RMS) value of the current applied to the one or more heating elements coupled to the buck converter 302.

Figure 4:
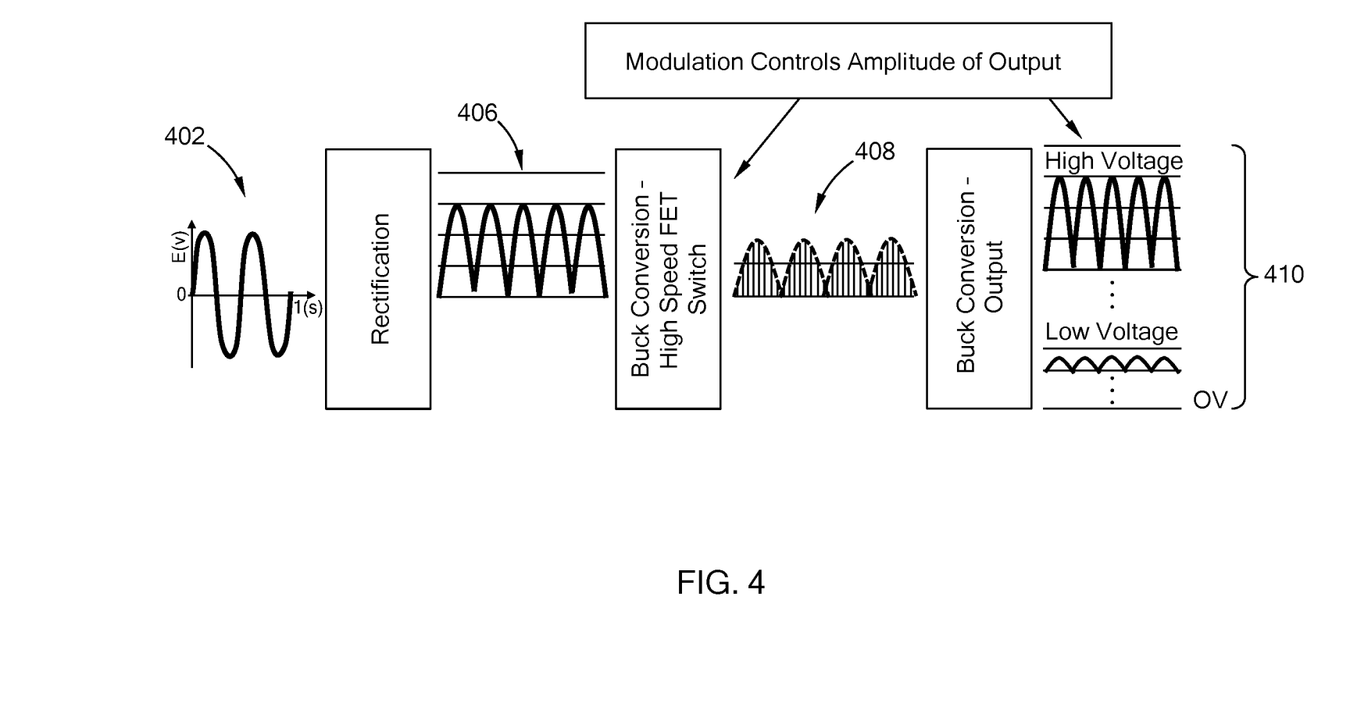
FIG. 4 is schematic diagram illustrating power conversion of an input voltage waveform in accordance with the teachings of the present disclosure.

Referring to FIG. 4, an example power conversion of an input signal from a power source through the system 100 is illustrated. An AC voltage 402 is converted to a rectified AC voltage signal 406 with ripples by way of passive or active rectifier. The rectified AC voltage 406 is selectively applied to the buck converter by the transistor, which is being switched driven by the controller 104. The buck converter outputs a voltage in a form of a plurality of pulses 408. Based on the information from the heater 102 and the operational state of the heater 102, the buck converter is operable to output a variable voltage 410 between a maximum voltage (e.g., 208) and a minimum voltage (e.g., 0V). Accordingly, the thermal system 100 independently controls the voltage applied to the heating elements, such that the voltage applied to one or more heating elements may be different from other heating elements.

Figure 5A:
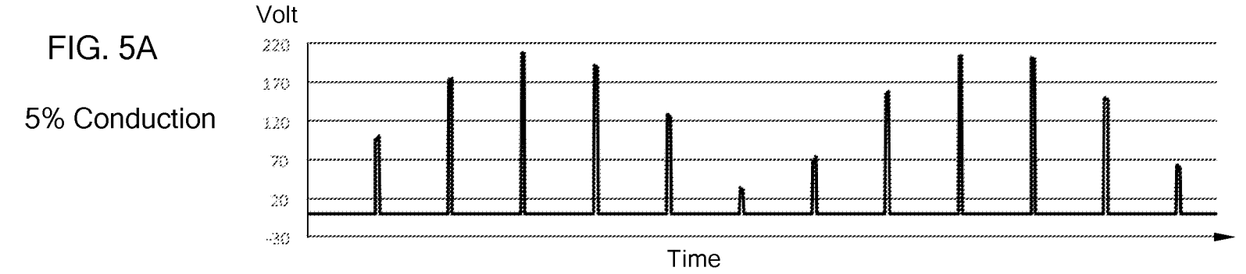
FIGS. 5A, 5B, and 5C illustrate waveforms of drive signals having different conduction rates in accordance with the teachings of the present disclosure.
Figure 5B:
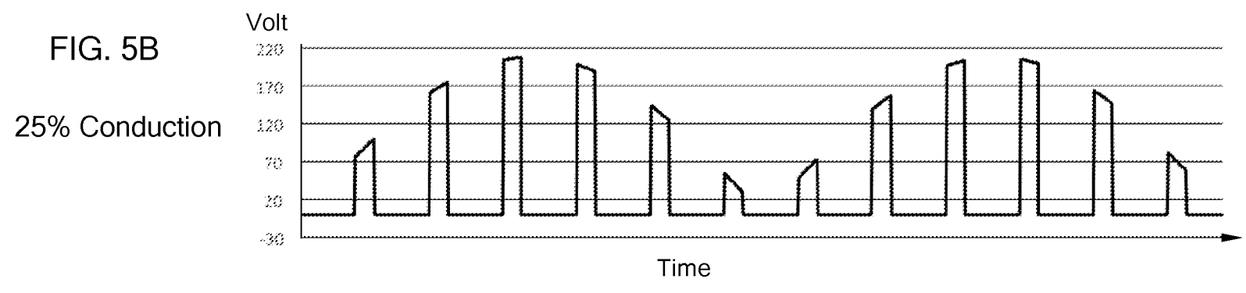
Figure 5C:
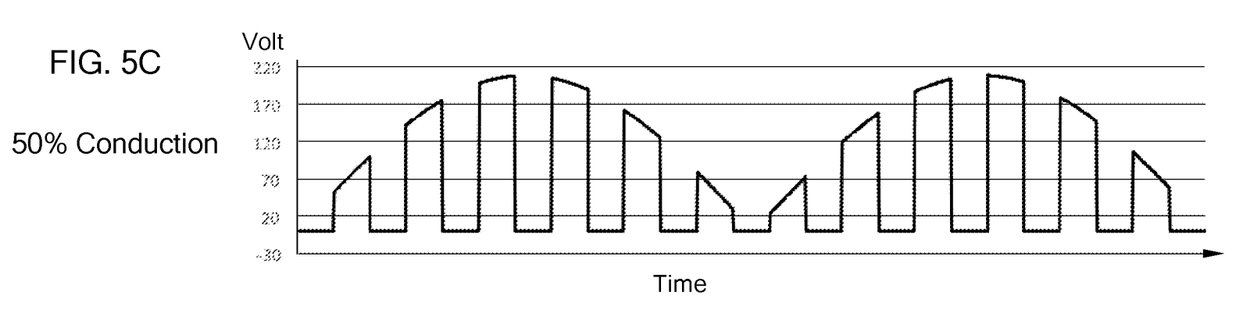
Figure 6A:
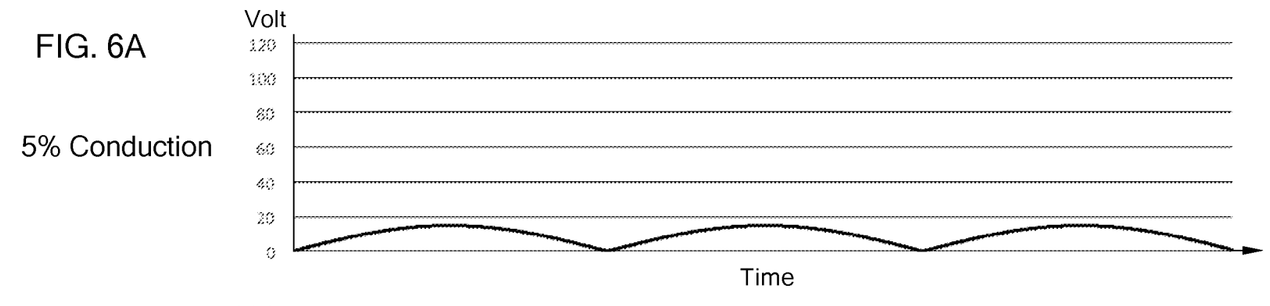
FIGS. 6A, 6B, and 6C illustrate waveforms of output voltages of the power converter based on the waveforms of FIGS. 5A, 5B, and 5C, respectively, in accordance with the teachings of the present disclosure.
Figure 6B:
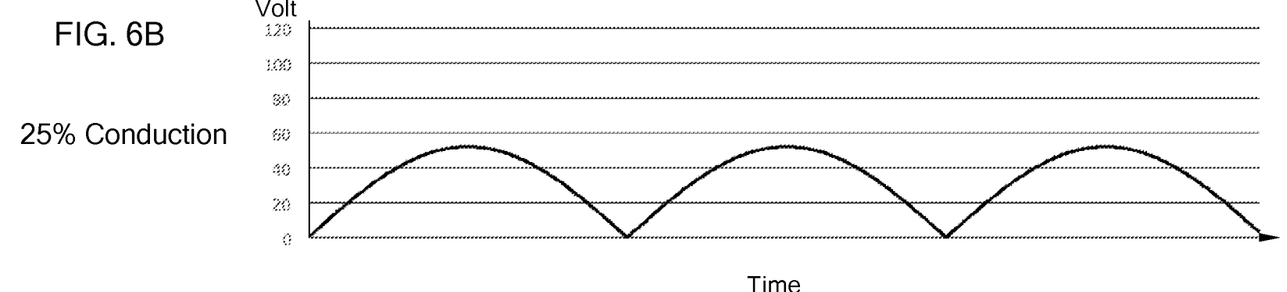
Figure 6C:
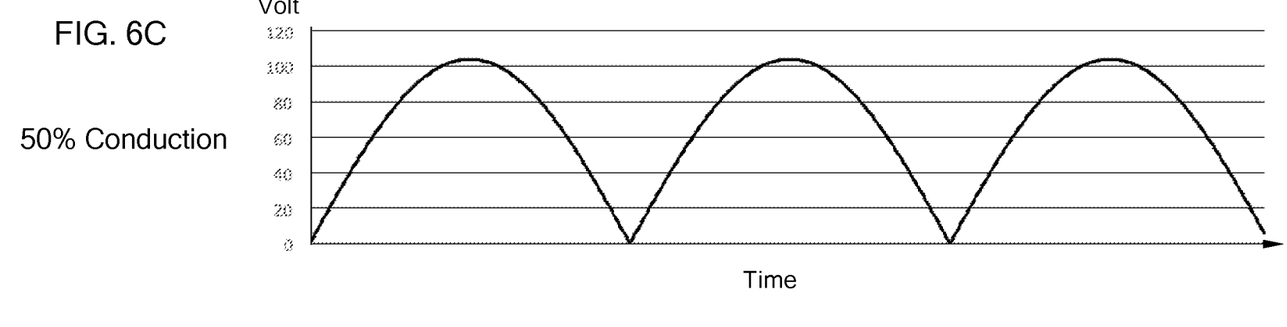

The pulse width of the drive signal applied to the transistor controls the output voltage of the buck converter. Specifically, the amplitude of the output voltage depends on a conduction rate (i.e., duty cycle) of the transistor. The smaller the conduction rate, the smaller the amplitude of the output voltage. For example, FIGS. 5A-5C illustrate drive waveforms for the transistor at different conduction rates (e.g. 5%, 25%, and 50%), and FIGS. 6A-6C illustrate expected output voltages of the buck converter based on the drive waveforms of FIGS. 5A-5C. When a modulated drive signal having a 50% conduction rate is applied to the transistor, the buck converter outputs a voltage that is greater than a voltage outputted with a drive signal having a 5% conduction rate. Accordingly, by controlling the pulse width of the drive signal, the controller 104 controls the output voltage of the power converter 116 and thus, independently controls the voltage applied to heating elements.

The controller 104 determines the desired output voltage of a given power converter 116 based on at least one of temperature, resistance, current and/or voltage at the heater 102, which are collectively referred to as input parameters.

For example, the controller 104 is configured to operate the power converter 116 to adjust the input voltage based on the resistance of the heater 102 such that power from power converter 116 matches the change in the resistance of the heating elements of the heater 102. In another example, the controller 104 switches the control switch at a selected duty cycle to adjust the input voltage, where the duty cycle is directly proportional to a scaling factor. The controller 104 selects the duty cycle based on at least one of the load current and the detected voltage at the heater 102 or, more specifically, a temperature of the respective heating elements.

In one form of the present disclosure, the controller 104 uses a state mode control in which the controller 104 determines an operational state of the heater 102 based on one or more of the input parameters. The operational state of the heater 102 includes: idle mode in which no power is being supplied to the heater 102; start-up mode in which low power is being supplied to measure voltage and current; soft-start mode in which the power is increased at a low ramp rate until a specific resistance setpoint is passed; rate mode in which the temperature is increased at a ramp rate selected based on a material of the heater; hold mode in which temperature of the heater 102 is controlled to a specific setpoint using, for example, a continuous proportional-integral-derivative controller (PID control). These operation states are merely exemplary and could include other modes while remaining within the scope of the present disclosure.

Based on the operational mode of the heater 102, the controller 104 independently controls the heating elements by adjusting the input voltage applied to the heating elements from a respective power converter. The controller 104 can be configured in various ways to adjust the input voltage including but not limited to: (1) modifying PID parameters according to the operational state; (2) changing a mode that is automatic (no user input) to manual (user inputs received by controller) or changing a mode that is manual to automatic; (3) setting a manual percent power; (4) starting a ramp setpoint ramp; (5) modifying an integral (holding term) of the PID control by offsetting the integral, scaling the integral, and/or making the modification based on temperature; and (6) changing voltage when a new operation state is entered. The logic used by the controller 104 for adjusting the voltage can be triggered in various suitable ways including but not limited to: (1) detecting start-up; (2) proximity of a process temperature to a setpoint; (3) deviation of the process temperature from the setpoint; (4) change in the setpoint; (5) exceeding the process temperature; (6) falling below the process temperature; (7) lapse of a predetermined time period; (8) a general system reading to be reached (e.g., current, voltage, wattage, resistance, and/or percent of power). The thermal system includes multiple states, where each state has unique settings to create a programmable state machine providing optimum performance in a dynamic system. Each state may define the next state that is entered when the condition is met.

The controller 104 is configured to operate the power converter system 106 to apply a continuously variable voltage to the heating elements of the heater 102. The variable voltage has different amplitudes of power. The heater 102 is less susceptible to thermal cracks by using variable voltage to control ramp rates, and thus the variable voltage is operable to reduce temperature differences between the different heating zones. Such benefits are further realized when the thermal system utilizes two-wire control.

In one form of the present disclosure, the controller 104 is configured to provide model-based control to match PID states to system states. A ramp-up rate and heater testing are based on the operational states of the heater. A typical control method for powering the heater 102 has potential issue of causing cracks in a ceramic substrate, particularly when the resistive heating element is made of a material having a relatively high thermal coefficient of resistance (TCR). During heater start-up, the resistive heating element has a relatively low resistance when cold, and the controller 104 of the present disclosure can manage low resistance cold start by limiting power and voltage, thereby inhibiting current-rush in. When a temperature of a respective heating zone is ramped up to a setpoint, a temperature difference between the respective zone and other zones is maintained within acceptable limits by adjusting ramp rates at the heater zones. Therefore, the power to the individual heating zones may be balanced. The ramp rate of the resistive heating elements may be controlled and adjusted by the controller in response to the operational states of the heating elements, thereby achieving a more uniform heating throughout the various heating zones.

FIGS. 7A, 7B, 7C, and 7D, illustrate example output voltage waveforms of a power converter that provides power to one or more heating elements of a heater during a start-up mode, a warm-up mode, a steady state mode, and at a disturbance, respectively. As shown, the voltage waveforms applied to the heating elements are different. The voltage varies depending on the resistance of the heating elements, the current flowing through the heating elements, and the temperature of the heating elements. During start-up and warm-up when the temperature is relatively low, the voltage has a relatively small amplitude and thus, the wattage is relatively low. During steady state and disturbance/surge when the temperature is relatively high, the amplitude of the voltage is increased resulting in higher wattage.

Figure 7A:
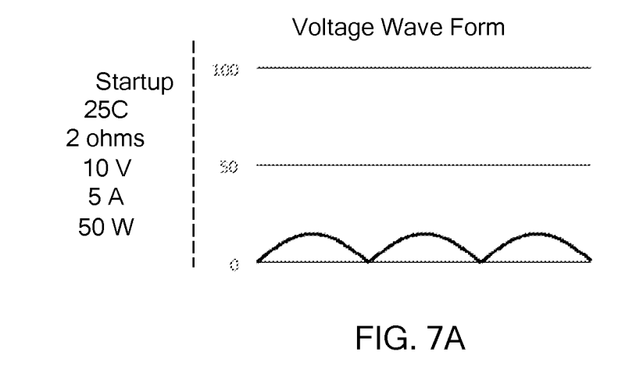
FIGS. 7A, 7B, 7C, and 7D illustrate waveforms of different output voltages of the power converter based on different input conditions in accordance with the teachings of the present disclosure.
Figure 7B:
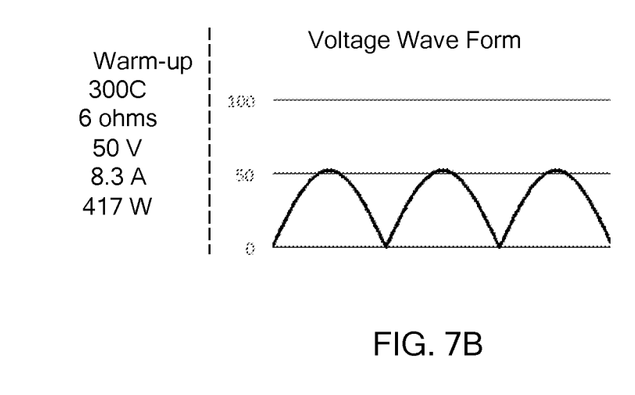
Figure 7C:
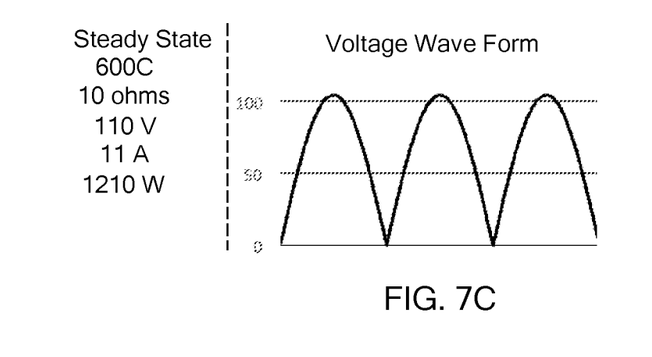
Figure 7D:
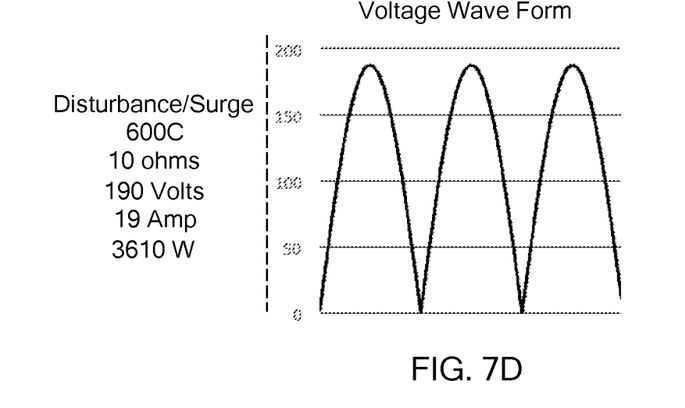

More particularly, with regard to start-up, the resistance of the heating elements is low (e.g. 3 ohms), and if the heating elements receive a full-line voltage (e.g., 208V), the instantaneous current flowing through the heating elements and the resulting power is significantly large (e.g., approx. 69 A and 14,352 W). With the power converter system 106, the controller 104 adjusts the input voltage to the heating elements to a much lower voltage, e.g., 3V, to control the current and power (e.g., 1 A and 3 W). The controller 104 may then gradually increase the voltage applied based on the resistance of the heating elements and feedback information.

Generally, different heating elements of a heater may not be heated at the same rate even though the same power supply is applied to the heating elements. This may be caused by various factors, such as positions of the heating elements relative to heat sinks and the manufacturing non-uniformity in the heating zones. When a significant temperature difference occurs between adjacent heating zones, a significant difference in thermal expansion in the adjacent heating zones may result in cracks in the ceramic substrate of the heating plate. The electronic thermal system of the present disclosure includes a power converter system that includes one or more power converters for providing varied power to the heating elements for a precise and safer control of the heating elements and thus, the heater. For example, lower power may be supplied to one or more heating elements to minimize peak current or may be provided at an early stage of the heating and during shutdown to prevent thermal cracks in the substrate of the heating plate. The controller controls the power converter system to output different voltages and thus, controls the temperature of the individual heating zones. Accordingly, the electrical thermal system of the present disclosure adjusts the temperature differences between different zones to provide uniform temperature throughout the heater.

Therefore, the controller controls variable power supply to the individual heating elements based on the temperature of the heating elements and/or the operational state of the heating elements. The variable power control method of the controller of the present disclosure may: 1) allow control of peak current and voltage; 2) size power drop for a maximum wattage delivered at highest setpoint, and not at startup in rush; 3) allow use of a signal phase to deliver desired power; 4) control startup at low voltage to allow for short circuit/shorted heater detection; 5) for two-wire controls, temperature measurements can be significantly more stable due to continuously stable sinusoidal conduction, thereby allowing more detailed diagnostics; and 6) set power factor at 1.0.

The controller can also measure/control heater characteristics, such as current, voltage, wattage, resistance, line frequency. The controller provides temperature control of individual heating zones and manages the temperature differences between different zones in order to provide uniform temperature throughout the heating plate to inhibit generation of thermal cracks.

With the power converter system, the controller is configured to control power supply from the power source to the heater. The power source may be an AC source with phase fire control or a DC source with a switching device, and the heating elements may be made of different materials with a wide range of resistances. For example, when molybdenum is used to form the heating element, the resistive heating element has very low resistance when cold and thus, draws relatively high currents. The power conversion technology of the present disclosure applies lower voltage to manage the current to an acceptable level during low resistance cold phase of warm up.

In addition, the controller also provides multiple supplementary and complementary sensing methods based on pedestal construction and application. For example, discrete temperature sensors such as thermocouples or RTDs (Resistance Temperature Detectors) may be used when placement/space allows. Optical florescent sensing may be used for a high plasma application, such as that disclosed in U.S. Pat. No. 9,625,923, which is commonly assigned with the present application and the contents of which are incorporated herein by reference in their entirety. Two-wire sensors, as set forth above, may also be employed. These temperature sensors may also be used for over temperature limiting, among other functions while remaining within the scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A control system for controlling an output voltage provided to a
   heater, the control system comprising:
   a controller configured to:
   determine an input parameter based on an electrical characteristic of the heater, wherein the heater includes a resistive heating element that is operable to emit heat and operable as a sensor, wherein the input parameter includes data indicative of a temperature of the resistive heating element that is determined based on the electrical characteristic, wherein the heater is configured to operate in a plurality of operational states comprising a start-up mode, a soft-start mode, a rate mode, and a hold mode, determine an operational state of the heater to be at least one of the start-up mode, the soft-start mode, the rate mode, and the hold mode based on the input parameter, wherein each of the start-up mode, the soft-start mode, the rate mode, and the hold mode has one or more unique settings to create a programmable state machine, wherein the start-up mode is a mode in which power is being supplied to measure voltage and current, the soft-start mode is a mode in which the power is increased at a ramp rate until a specific resistance setpoint is passed, the rate mode is a mode in which the temperature is increased at a ramp rate selected based on a material of the heater, and the hold mode is a mode in which the temperature of the heater is controlled to a specific setpoint, determine the output voltage for the heater based on the input parameter and a desired setpoint using the programmable state machine, wherein the desired setpoint is based on the operational state of the heater, transmit a signal to a power converter to generate the output voltage, and control the heater based on the signal to the power converter.

2. The control system of claim 1 further comprising the power converter including a power switch and operable to generate the output voltage.

3. The control system of claim 2, wherein the power converter includes:
the power switch configured to generate the output voltage; and
a driver circuit configured to operate the power switch to generate the output voltage.

4. The control system of claim 1 further comprising a sensor circuit configured to measure the electrical characteristic of the heater.

5. The control system of claim 1, wherein the electrical characteristic includes at least one of a voltage and an electric current of the heater.

6. The control system of claim 1 further comprising:
the power converter electrically coupled to the heater by way of temperature sensing power pins that define a first junction and a second junction; and
a sensor circuit configured to electrically couple to the first junction and the second junction, wherein the controller is configured to measure a change in voltage at the first junction and the second junction, as the electrical characteristic, via the sensor circuit and determine the temperature of the resistive heating element, as the input parameter, based on the change in voltage.

7. The control system according to claim 1, wherein the desired setpoint includes at least one of a desired power level, a desired temperature, a rate of change in temperature, and a rate in change of power.

8. The control system of claim 1, wherein the controller is configured to select the operational state from among the plurality of defined operational states, and wherein each operational state defines a next state that is entered in response to an input condition being met.

9. The control system of claim 8, wherein the controller is configured to independently control a plurality of heating elements of the heater based on the operational state, and wherein a model-based control uses the programmable state machine to match process ID (PID) proportional-integral-derivative states to system states.

10. The control system of claim 8, wherein the controller is configured to perform a model-based control routine to match a proportional-integral derivative state of the heater to the operational state.

11. The control system of claim 1, wherein:
a sensor circuit is configured to measure a voltage and an electric current of the heater, as the electrical characteristic, and
the controller is configured to:
calculate a resistance of the resistive heating element, as the input parameter, based on the voltage and the electric current,
determine the temperature of the resistive heating element based on the resistance, and
set the output voltage based on the temperature, the resistance, the voltage, the electric current or a combination thereof, wherein the input parameter includes data indicative of at least one of the resistance, the voltage, and the electric current of the resistive heating element.

12. The control system of claim 1, wherein the input parameter includes data indicative of at least one of a resistance, an electric current, and a voltage of the resistive heating element.

13. The control system of claim 1, wherein the controller is configured to: calculate a resistance of the resistive heating element, as the input parameter, based on a voltage and an electric current of the resistive heating element, as the electrical characteristic, determine the temperature of the resistive heating element based on the resistance, and set the output voltage based on the temperature, the resistance, the voltage, the electric current, or a combination thereof.

14. The control system of claim 1, wherein the controller is configured to continuously vary an amplitude of the output voltage based on a desired power of the heater.

15. The control system of claim 1 further comprising:
the power converter including a power switch and operable to generate an adjustable output voltage; and
a sensor circuit configured to measure the electrical characteristics of the heater, wherein the electrical characteristics includes at least one of a voltage and an electric current, and
wherein the controller is configured to operate the power switch of the power converter to generate the output voltage.

16. A method for controlling a heater, the method comprising:
measuring, by a processor, at least one of a voltage and an electric current of the heater, wherein the heater includes a resistive heating element that is operable to emit heat and operable as a sensor;
determining, by the processor, an input parameter based on the at least one of the voltage and the electric current, wherein the input parameter includes data indicative of a temperature of the resistive heating element; wherein the heater is configured to operate in a plurality of operational states comprising a start-up mode, a soft-start mode, a rate mode, and a hold mode,
determining, by the processor, an operational state of the heater to be at least one of the start-up mode, the soft-start mode, the rate mode, and the hold mode based on the input parameter, wherein each of the start-up mode, the soft-start mode, the rate mode, and the hold mode has one or more unique settings to create a programmable state machine; wherein the start-up mode is a mode in which power is being supplied to measure voltage and current, the soft-start mode is a mode in which the power is increased at a ramp rate until a specific resistance setpoint is passed, the rate mode is a mode in which the temperature is increased at a ramp rate selected based on a material of the heater, and the hold mode is a mode in which the temperature of the heater is controlled to a specific setpoint, setting, by the processor, an output voltage for the heater based on the input parameter and a desired setpoint using the programmable state machine, wherein the desired setpoint is based on an operational state of the heater; and controlling the heater based on the output voltage.

17. The method of claim 16, wherein the desired setpoint includes at least one of a desired power level, a desired temperature, a rate of change in temperature, and a rate in change of power.

18. The method of claim 16 further comprising: calculating a resistance of the resistive heating element, as the input parameter, based on the voltage and the electric current, as the electrical characteristic; and determining the temperature of the resistive heating element based on the resistance, wherein the output voltage is set based on the temperature, the resistance, the voltage, the electric current, or a combination thereof.

19. The method of claim 16, wherein the input parameter includes data indicative of at least one of a resistance of the resistive heating element, the electric current of the resistive heating element, the voltage of the resistive heating element, and an applied power.

* * * * *